United States Patent
Whitby-Strevens (10) Patent No.: US 9,647,701 B2
(45) Date of Patent: May 9, 2017

(54) METHODS AND APPARATUS FOR THE INTELLIGENT ASSOCIATION OF CONTROL SYMBOLS

(71) Applicant: Apple Inc., Cupertino, CA (US)

(72) Inventor: Colin Whitby-Strevens, Ben Lomond, CA (US)

(73) Assignee: Apple, Inc., Cupertino, CA (US)

( * ) Notice: Subject to any disclaimer, the term of this patent is extended or adjusted under 35 U.S.C. 154(b) by 63 days.

(21) Appl. No.: 14/273,258

(22) Filed: May 8, 2014

(65) Prior Publication Data

US 2015/0078479 A1 Mar. 19, 2015

Related U.S. Application Data

(63) Continuation of application No. 12/976,274, filed on Dec. 22, 2010, now Pat. No. 8,750,176.

(51) Int. Cl.
*H04B 1/04* (2006.01)
*G08C 19/00* (2006.01)
(Continued)

(52) U.S. Cl.
CPC .......... *H04B 1/0475* (2013.01); *G08C 19/00* (2013.01); *H04B 1/12* (2013.01); *H04L 25/4908* (2013.01)

(58) Field of Classification Search
None
See application file for complete search history.

(56) References Cited

U.S. PATENT DOCUMENTS 3,902,117 A 8/1975 Sheppard
4,523,181 A 6/1985 Tazaki et al.
(Continued)

FOREIGN PATENT DOCUMENTS

CN 101573873 A 11/2009
CN 102290024 A 12/2011
(Continued)

OTHER PUBLICATIONS

Extended European Search Report for Application No. EP14163280, mailed on May 8, 2015, 15 pages.
(Continued)

*Primary Examiner* — Ayaz Sheikh
*Assistant Examiner* — Faiyazkhan Ghafoerkhan
(74) *Attorney, Agent, or Firm* — Gazdzinski & Associates, PC (57) ABSTRACT

Methods and apparatus for the intelligent association of control symbols with special symbols that are transmitted over a network. In one embodiment, the association is utilized to improve DC-balance on a transmission medium. In an exemplary variant, the special symbols originate from line codes such as the 8B/10B line code, which format a digital signal so that is optimized for transmission over a given physical channel. These control symbols are divided up according to a first criterion, while the special symbols are further divided up according to a second criterion. The divided control symbols are then allocated to the divided special symbols using a pre-designated allocation algorithm, which may or may not include a scrambling algorithm. The allocation of the control symbols improves signal characteristics and electromagnetic interference (EMI) when various ones of control symbols are ultimately transmitted over a given transmission medium.

5 Claims, 4 Drawing Sheets (51) Int. Cl.
  *H04L 25/49* (2006.01)
  *H04B 1/12* (2006.01)

(56) References Cited

U.S. PATENT DOCUMENTS

| | | | |
|---|---|---|---|
| 4,791,407 A | 12/1988 | Prucnal et al. | |
| 5,224,096 A | 6/1993 | Onishi et al. | |
| 5,461,426 A | 10/1995 | Limberg et al. | |
| 5,961,608 A | 10/1999 | Onosaka et al. | |
| 5,961,680 A | 10/1999 | Wooldridge | |
| 6,078,532 A | 6/2000 | Rivers et al. | |
| 6,222,891 B1 | 4/2001 | Liu et al. | |
| 6,381,332 B1 | 4/2002 | Glaab | |
| 6,426,780 B1 | 7/2002 | Limberg et al. | |
| 6,516,437 B1 | 2/2003 | Van Stralen et al. | |
| 6,574,731 B1 | 6/2003 | Coles et al. | |
| 6,597,743 B1 | 7/2003 | Khayrallah et al. | |
| 6,618,395 B1 | 9/2003 | Kimmitt | |
| 6,654,926 B1 | 11/2003 | Raphaeli et al. | |
| 6,775,334 B1 | 8/2004 | Liu et al. | |
| 6,870,930 B1 | 3/2005 | Kim et al. | |
| 7,062,587 B2 | 6/2006 | Zaidi et al. | |
| 7,062,687 B1 | 6/2006 | Gfeller et al. | |
| 7,062,689 B2 | 6/2006 | Slobodnik | |
| 7,257,163 B2 * | 8/2007 | Hwang | H04L 1/0041 348/473 |
| 7,359,437 B2 | 4/2008 | Hwang et al. | |
| 7,365,575 B2 | 4/2008 | Kim | |
| 7,394,406 B2 | 7/2008 | Pasqualino | |
| 7,403,486 B2 | 7/2008 | Flask | |
| 7,460,031 B2 | 12/2008 | Yeo et al. | |
| 7,561,074 B2 | 7/2009 | Pasqualino | |
| 7,573,596 B2 | 8/2009 | Owen | |
| 7,639,687 B1 * | 12/2009 | Tsai | H04L 25/05 370/392 |
| 7,672,285 B2 * | 3/2010 | Sun | H04B 7/1858 370/342 |
| 7,773,752 B2 * | 8/2010 | Noh | H04N 7/163 380/200 |
| 7,961,880 B2 * | 6/2011 | Wang | H04K 1/00 375/148 |
| 8,000,404 B2 | 8/2011 | Talbot et al. | |
| 8,139,660 B2 * | 3/2012 | Anigstein | H04L 5/0007 370/312 |
| 8,253,605 B2 | 8/2012 | Rivoir | |
| 8,325,699 B2 * | 12/2012 | Sun | H04B 7/1858 370/342 |
| 8,432,791 B1 | 4/2013 | Masters | |
| 8,588,287 B2 | 11/2013 | Chen et al. | |
| 8,644,504 B2 | 2/2014 | Choi | |
| 8,650,010 B2 * | 2/2014 | M | G06F 11/24 324/601 |
| 8,678,860 B2 | 3/2014 | Minich et al. | |
| 8,737,625 B2 | 5/2014 | Ikeda et al. | |
| 8,750,176 B2 | 6/2014 | Whitby-Strevens | |
| 8,838,822 B2 | 9/2014 | Spalla et al. | |
| 8,917,194 B2 | 12/2014 | Whitby-Strevens | |
| 8,949,493 B1 | 2/2015 | Wortman et al. | |
| 9,210,010 B2 | 12/2015 | Whitby-Strevens | |
| 2001/0022813 A1 | 9/2001 | Tan et al. | |
| 2002/0051562 A1 | 5/2002 | Sheppard et al. | |
| 2002/0138721 A1 * | 9/2002 | Kwon | H04J 13/10 713/151 |
| 2002/0159553 A1 | 10/2002 | McCarty, Jr. et al. | |
| 2003/0005436 A1 | 1/2003 | Naganuma | |
| 2003/0043141 A1 * | 3/2003 | Bae | G09G 5/006 345/211 |
| 2003/0048851 A1 * | 3/2003 | Hwang | H04L 1/0057 375/240.26 |
| 2003/0048852 A1 * | 3/2003 | Hwang | H04L 1/0041 375/240.26 |
| 2003/0165182 A1 | 9/2003 | O'Farrell | |
| 2003/0168512 A1 | 9/2003 | Longacre, Jr. et al. | |
| 2003/0214507 A1 | 11/2003 | Mawatari et al. | |
| 2004/0002312 A1 | 1/2004 | Li et al. | |
| 2004/0071158 A1 | 4/2004 | Wei | |
| 2004/0071221 A1 | 4/2004 | Nakada et al. | |
| 2004/0088633 A1 * | 5/2004 | Lida | H03M 5/145 714/752 |
| 2004/0103363 A1 * | 5/2004 | Kim | H04L 25/4908 714/809 |
| 2004/0131025 A1 * | 7/2004 | Dohler | H04B 7/2606 370/328 |
| 2005/0012592 A1 * | 1/2005 | Debelleix | G07C 9/00158 340/5.52 |
| 2005/0175122 A1 | 8/2005 | Nefedov et al. | |
| 2005/0185796 A1 | 8/2005 | Lablans | |
| 2005/0286643 A1 * | 12/2005 | Ozawa | H03L 7/087 375/242 |
| 2006/0095613 A1 * | 5/2006 | Venkata | G06F 13/385 710/62 |
| 2006/0117125 A1 * | 6/2006 | Tseng | G06F 11/27 710/301 |
| 2006/0190589 A1 | 8/2006 | Parker et al. | |
| 2006/0250628 A1 | 11/2006 | Owen | |
| 2007/0016778 A1 * | 1/2007 | Lyle | H04L 9/12 713/169 |
| 2007/0016779 A1 * | 1/2007 | Lyle | H04L 9/12 713/169 |
| 2007/0074242 A1 * | 3/2007 | Wang | H04K 1/00 725/31 |
| 2007/0107034 A1 | 5/2007 | Gotwals | |
| 2007/0116055 A1 * | 5/2007 | Atsumi | H04J 3/1658 370/476 |
| 2007/0139232 A1 * | 6/2007 | Venkata | G06F 13/385 341/50 |
| 2007/0192664 A1 | 8/2007 | Ogawa et al. | |
| 2007/0204204 A1 | 8/2007 | Sul et al. | |
| 2007/0206638 A1 * | 9/2007 | Santoru | H04N 21/4382 370/476 |
| 2007/0206642 A1 * | 9/2007 | Egan | G09G 5/006 370/479 |
| 2007/0220279 A1 * | 9/2007 | Northcutt | H04L 25/03159 713/193 |
| 2007/0230687 A1 | 10/2007 | Talbot et al. | |
| 2007/0237332 A1 * | 10/2007 | Lyle | H04L 9/12 380/263 |
| 2007/0242764 A1 * | 10/2007 | Anigstein | H04L 5/0007 375/260 |
| 2007/0257923 A1 * | 11/2007 | Whitby-Strevens | G09G 5/006 345/520 |
| 2008/0024334 A1 * | 1/2008 | Grivna | H03M 5/145 341/95 |
| 2008/0046728 A1 * | 2/2008 | Lyle | H04L 9/12 713/169 |
| 2008/0095218 A1 * | 4/2008 | Murray | H03M 5/145 375/150 |
| 2008/0180287 A1 * | 7/2008 | Widmer | H03M 7/20 341/95 |
| 2008/0204285 A1 * | 8/2008 | Carter | H04L 5/0092 341/67 |
| 2008/0215934 A1 | 9/2008 | Liu | |
| 2008/0235551 A1 * | 9/2008 | Lin | H04L 25/03019 714/746 |
| 2008/0252497 A1 * | 10/2008 | Widmer | H03M 7/20 341/95 |
| 2008/0258945 A1 * | 10/2008 | Widmer | H03M 7/20 341/95 |
| 2008/0263621 A1 * | 10/2008 | Austerlitz | H04N 21/43615 725/139 |
| 2008/0273602 A1 * | 11/2008 | Glen | H04B 1/74 375/257 |
| 2008/0304596 A1 | 12/2008 | Tan et al. | |
| 2009/0010318 A1 * | 1/2009 | Belogolovyi | H04L 25/4917 375/222 |
| 2009/0024756 A1 * | 1/2009 | Spalla | H04L 1/0057 709/231 |
| 2009/0100179 A1 | 4/2009 | Song et al. | |
| 2009/0147864 A1 * | 6/2009 | Lida | H04L 5/143 375/257 |

(56) References Cited

U.S. PATENT DOCUMENTS

| | | | |
|---|---|---|---|
| 2009/0185565 A1* | 7/2009 | Diab | H04L 12/40039 370/394 |
| 2010/0057556 A1 | 3/2010 | Rousso et al. | |
| 2010/0067693 A1* | 3/2010 | Courington | H04N 7/165 380/210 |
| 2010/0074350 A1 | 3/2010 | Malladi et al. | |
| 2010/0111100 A1 | 5/2010 | Baumer | |
| 2010/0118795 A1 | 5/2010 | Hassan | |
| 2010/0128816 A1* | 5/2010 | Sun | H04B 7/1858 375/298 |
| 2010/0238951 A1* | 9/2010 | Ozawa | G06F 3/14 370/465 |
| 2010/0262893 A1* | 10/2010 | Carter | H04L 1/0083 714/777 |
| 2010/0322340 A1 | 12/2010 | Bohm | |
| 2011/0026414 A1 | 2/2011 | Banerjee | |
| 2011/0122142 A1* | 5/2011 | Wyatt | G06F 3/14 345/581 |
| 2011/0208954 A1 | 8/2011 | Barrett et al. | |
| 2011/0246840 A1 | 10/2011 | Khoshnevis et al. | |
| 2011/0310296 A1 | 12/2011 | Lee et al. | |
| 2011/0320905 A1* | 12/2011 | Lin | H04L 1/0067 714/752 |
| 2012/0084559 A1 | 4/2012 | Bonicatto | |
| 2012/0087973 A1 | 4/2012 | Lieberman et al. | |
| 2012/0139593 A1 | 6/2012 | Saito et al. | |
| 2012/0146989 A1* | 6/2012 | Whitby-Strevens | G09G 5/006 345/213 |
| 2012/0163490 A1* | 6/2012 | Whitby-Strevens | G08C 19/00 375/285 |
| 2012/0188951 A1 | 7/2012 | He et al. | |
| 2013/0195160 A1 | 8/2013 | Whitby-Strevens | |
| 2013/0195218 A1* | 8/2013 | Whitby-Strevens | H04B 15/00 375/296 |
| 2014/0344650 A1 | 11/2014 | Au | |

FOREIGN PATENT DOCUMENTS

| | | |
|---|---|---|
| EP | 1517295 A2 | 3/2005 |
| EP | 1940034 A1 | 7/2008 |
| EP | 2490473 A1 | 8/2012 |
| KR | 20070092676 A | 9/2007 |
| WO | WO-03058826 A2 | 7/2003 |
| WO | WO-2011044793 A1 | 4/2011 |
| WO | WO-2012087973 A1 | 6/2012 |
| WO | WO-2013112930 A2 | 8/2013 |

OTHER PUBLICATIONS

IEEE Standard for a High-Performance Serial Bus, IEEE Computer Society, Oct. 21, 2008.

International Preliminary Report on Patentability for Application No. PCT/US2013/023289, mailed on Jul. 29, 2014, 10 pages.

International Search Report and Witten Opinion for Application No. PCT/US2013/023289, mailed on Nov. 21, 2013, 15 pages.

International Search Report for Application No. PCT/US2014/014287, mailed on Aug. 5, 2014, 4 pages.

International Search Report for Application No. PCT/US2014/030660, mailed on Jul. 21, 2014, 4 pages.

International Search Report for Application No. PCT/US2011/065918, mailed on Apr. 24, 2012.

International Search Report for Application No. PCT/US2013/023284, mailed on Aug. 26, 2013, 5 pages.

Nxp: "Technical Analysis of the JEDEC JESD204A Data Converter Interface" Jun. 1, 2009, (Jun. 1, 2009), XP055070699, Retrieved from Internet: URL:http://www.nxp.com/wcmadocuments/newsklownload-media/publications/technical_whitepaper final.pdf [retrieved on Jul. 10, 2013) section 3.2 last but one par. p. 12 2nd par. p. 3; figure 4.

Office Action mailed Jul. 17, 2015 for Chinese Application No. 201380012660 filed Jan. 25, 2013, 22 pages.

Office Action mailed May 22, 2015 for Taiwan Application No. 102102988 filed Jan. 25, 2013, 8 pages.

Stein, Digital Signal Processing, a Computer Science Perspective, 2000, John Wiley & Sons Inc., pp. 712-713.

Video Electronics Standards Association: "Displayport Standard Version 1.1", Mar. 19, 2007, pp. 1-228.

Widmer, A. X., Franaszek, PA., "A DC/Balanced, Partitioned/Block, 8B/10B Transmission Code", IBM I_Res. Develop, vol. 27, No. 5, Sep. 1983, pp. 440-451.

Written Opinion for Application No. PCT/US2011/065918, mailed on Apr. 24, 2012.

Written Opinion Search Report for Application No. PCT/US2013/023284, mailed on Aug. 26, 2013, 11 pages.

Display Port Standard Version 1.1 (Mar. 19, 2007) (Vesa, www.vesa.org).

Ajanovic J., "PC I Express 3.0 Overview," Hot Chips—Aug. 23, 2009, pp. 1-61.

Video Electronics Standards Association: "Display port Standard Version 1.1", Mar. 19, 2007, pp. 1-228.

* cited by examiner

METHODS AND APPARATUS FOR THE INTELLIGENT ASSOCIATION OF CONTROL SYMBOLS

PRIORITY APPLICATIONS

This application is a continuation of and claims priority to co-owned, co-pending U.S. patent application Ser. No. 12/976,274 entitled "METHODS AND APPARATUS FOR THE INTELLIGENT ASSOCIATION OF CONTROL SYMBOLS", filed Dec. 22, 2010, which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data networking and telecommunications. More particularly, in one exemplary aspect, the present invention is directed to the intelligent association of control symbols with special symbols that are transmitted over a network in order to improve DC-balance on a transmission medium.

2. Description of Related Technology

DisplayPort is an emerging digital display interface technology specified by the Video Electronics Standards Association (VESA). Current incarnations of the standard specify support for simple networking of digital audio/visual (A/V) interconnects, intended to be used primarily between an arbitrary assembly of multimedia "sources" (e.g., computers or CPUs) and "sinks" (e.g., display monitors, home-theater system, etc.). This interconnection is generally unidirectional in nature; i.e., from source to sink, in current implementations.

Extant DisplayPort technology is an extensible digital interface solution that is designed for a wide variety of performance requirements, and broadly supports PCs, monitors, panels, projectors, and high definition (HD) content applications. Current DisplayPort technology is also capable of supporting both internal (e.g., chip-to-chip), and external (e.g., box-to-box) digital display connections. Examples of internal chip-to-chip applications include notebook PCs, which drive a display panel from a graphics controller, or display components from display controllers driving the monitor of a TV. Examples of box-to-box applications include display connections between PCs and monitors, and projectors (e.g., not housed within the same physical device). Consolidation of internal and external signaling methods enables the "direct drive" of digital monitors. Direct drive eliminates the need for control circuits, and allows for among other things, cheaper and slimmer display devices.

The current revision of DisplayPort (DisplayPort1.1a) transmits both control symbols and data symbols. While data symbols are scrambled in order to, inter alia, provide DC-balance on the transmission medium, control symbols currently are not. Control symbols have historically not needed to be scrambled, as the transmission of non-scrambled control symbols allows the relatively rare control symbols to be instantly identified when received at, for example, a sink.

Revisions currently being considered for future revisions of DisplayPort have given rise to concerns of EMI and/or inter-symbol interference (ISI) over the transmission medium, as there are some circumstances in which certain control symbols may in the future occur at relatively closely spaced intervals, and/or repeat in a fashion which gives rise to interference concerns.

Accordingly, improved apparatus and methods are needed in order to address these future EMI and EMC concerns with regards to control symbols in a DisplayPort network. Such improved apparatus and methods would ideally reduce the effects of EMI in situations such as when the control symbols occur at closely spaced intervals. More generally, such apparatus and methods would provide for mechanisms that improve the characteristics of the symbols transmitted over the transmission medium, while advantageously leveraging existing hardware so as to minimize circuitry costs in future implementations.

In addition, such improved apparatus and methods would ideally take advantage of knowledge about the existing system including: (1) the expected frequency of transmitted control symbols; and (2) the EMI costs associated with expected control symbol transmission patterns; and/or (3) the specific control symbols that unambiguously identify major delineation points or functions in the format of the data.

Lastly, such improved apparatus and methods should not introduce significant costs in terms of communications bandwidth, in order to ensure that the system bandwidth is fully utilized whether or not control symbols are scrambled.

SUMMARY OF THE INVENTION

The present invention satisfies the aforementioned needs by providing improved apparatus and methods for intelligently allocating (e.g., scrambling or permuting) control symbols over a communications network.

In one aspect of the invention, a method of processing data is disclosed. In one embodiment, the data is transmitted on a high-speed bus of a computerized device so as to mitigate electromagnetic interference, and includes both control data and payload data. The method includes: scrambling at least a portion of the payload data according to a first scheme; and scrambling at least a portion of the control data according to a second scheme, the second scheme comprising: dividing the control data into at least two groups, the dividing being based at least in part on the value of a parameter associated with individual ones of the control data; selectively scrambling at least portions of the at least two groups according to a scrambling algorithm; and transmitting the control data onto the high-speed bus. The selective scrambling reduces the level of the electromagnetic interference when the control data is transmitted on the bus.

In one variant, the parameter relates to the level of electromagnetic interference created by the individual ones of the control data. Alternatively, the parameter relates to the frequency of occurrence of the individual ones of the control data.

In another variant, at least the payload data is carried according to a packet protocol, and the high-speed bus includes one compliant with a DisplayPort Standard.

In yet another variant, the further includes 8B10B encoding at least portions of the control data and payload data.

In a second aspect of the invention, a method for associating a control symbol with a transmitted encoded control code is disclosed. In one embodiment, the method includes: determining an index value for the control symbol; executing a logical function on the index value to create an encoded value; associating an encoded control code with the encoded value; and transmitting the encoded control code over a physical medium.

In one variant, the control symbol is a DisplayPort control symbol, and the encoded control code is an 8B10B code.

In another variant, the method reduces electromagnetic interference associated with the medium when the encoded control code is transmitted with other encoded control codes.

In yet another variant, the logical function includes an exclusive OR (XOR) function.

In a third aspect of the invention, a method for associating a control function associated with an audiovisual implementation with a DC-balanced control code is disclosed. In one variant, the method includes: determining a grouping for the control function; and associating an index value for the control function based at least in part on the determination of the grouping. If the grouping for the control function includes a first group, then the method includes executing a logical function on the index value to create an encoded value; associating the encoded value with the DC-balanced control code; and transmitting the DC-balanced control code onto a network bus. Otherwise, if the grouping for the control function includes a second group, the method includes associating the index value with the DC-balanced control code; and transmitting the DC-balanced control code onto the network bus.

In one variant, the logical function includes an exclusive OR (XOR) function, and the DC-balanced control code is a constant-weight line code.

In another variant, the act of determining a grouping for the control function includes determining one of a first group and a second group, the first group having a larger population than the second group.

In a fourth aspect of the invention, a method for identifying a transmitted control function is disclosed. In one embodiment, the method includes: receiving a DC-balanced control code via a network interface; determining an association between the DC-balanced control code and an index value; and identifying the transmitted control function based at least in part on the association.

In one variant, the act of identifying further includes: de-scrambling the index value to obtain a de-scrambled index value; and determining an association between the de-scrambled index value and the transmitted control function. The index value is scrambled using e.g., an exclusive OR (XOR) function and a plurality of bits.

In another variant, the control function is transmitted over a high-speed mini-packet protocol network of two or more devices, one of the devices comprising the network interface.

In a fifth aspect of the invention, a method of processing control data transmitted on a bus of a computerized device is disclosed. In one embodiment, the control data is associated with payload data, and the method includes: dividing the control data into at least two groups based at least in part on a criterion associated with individual ones of the control data; selectively scrambling at least a portion of at least one of the two groups according to a scrambling algorithm; and transmitting the control data onto the bus.

In one variant, the selective scrambling reduces the level of the electromagnetic interference when the control data is transmitted on the bus.

In another variant, the criterion relates to a level of electromagnetic interference created by the individual ones of the control data, or to a frequency of occurrence of the individual ones of the control data, and the scrambling algorithm includes an exclusive OR (XOR) function.

In a sixth aspect of the invention, an apparatus configured to transmit and/or receive encoded control symbols is disclosed. In one variant, the apparatus includes a computerized device (e.g., personal computer, laptop, etc.) having a high-speed unidirectional or bi-directional data interface. In one variant, the interface is compliant with the DisplayPort packetized protocol(s). In another variant, the device and interface are enhanced through reduction of EMI generated when the control symbols are transmitted.

In another aspect of the invention, a computer-readable apparatus is disclosed. In one embodiment, the apparatus includes a storage medium and adapted for use within a computerized device. The medium includes at least one computer program configured to, when executed on a processor, implement one or more of the foregoing methods.

In yet another aspect of the invention, business methods and models employing one or more of the foregoing aspects are described.

Other features and advantages of the present invention will immediately be recognized by persons of ordinary skill in the art with reference to the attached drawings and detailed description of exemplary embodiments as given below.

DETAILED DESCRIPTION OF THE INVENTION

Reference is now made to the drawings, wherein like numerals refer to like parts throughout.
Overview In one aspect, the present invention provides methods and apparatus for the intelligent association of control symbols with "special" symbols that are transmitted over a communications network, in order for example to improve DC-balance on a transmission medium. These special symbols originate from, for example, line codes such as the exemplary 8B/10B line code, which render a digital signal that is to be transmitted over a communication medium into a form that is optimized for transmission over a given physical channel.

In an exemplary embodiment, these control symbols are divided up according to a first criterion, while the special symbols are further divided up according to a second criterion. The divided control symbols are then intelligently allocated to the divided special symbols using an allocation algorithm, which may or may not include a scrambling algorithm. The intelligent allocation of the control symbols to the divided special symbols allows for improved signal characteristics when information about various ones of control symbols are ultimately transmitted over a given transmission medium.

DETAILED DESCRIPTION OF EXEMPLARY EMBODIMENTS

Exemplary embodiments of the present invention are now described in detail. While these embodiments are primarily discussed in the context of a Video Electronics Standards Association (VESA) DisplayPort audio/visual (A/V) component network, it will be recognized by those of ordinary skill that the present invention is not so limited. As used herein, the term "DisplayPort" refers without limitation to apparatus and technology compliant with "VESA DisplayPort Standard"—Version 1, Revision 2 dated Jan. 5, 2010; "VESA DisplayPort Panel Connector Standard"—Version 1.1 dated Jan. 4, 2008; "VESA DisplayPort™ PHY Compliance Test Standard"—Version 1.1a dated Oct. 26, 2009; and/or "VESA DisplayPort™ Link Layer Compliance Test Standard"—Version 1.1 a, dated Oct. 2, 2009, each of the foregoing being incorporated herein by reference in its entirety, and any subsequent revisions thereof. In fact, the various aspects of the invention are useful in any network that can benefit from the intelligent association of control symbols to special symbols in order to improve DC-balance on the transmission medium as is disclosed herein.

In addition, while these embodiments are also primarily discussed in the context of a partitioned 8B/10B encoder, it will be recognized by those of ordinary skill that the present invention is useful with literally any type of scrambling algorithm or line code. For example, the various aspects of the invention described herein could be readily be adapted for use with any line code (such as 64B/66B encoding) that can be utilized to achieve reduced inter-symbol interference over a data or communications network.

Furthermore, while these embodiments are disclosed in a serial transmission of digital data represented as electrical levels, ones having ordinary skill in the related arts will recognize that the various techniques may also extend to other systems and applications including, inter alia, multi-level wired systems (e.g., three-level encoded Ethernet), and modulated transmission schemes (e.g., a high frequency carrier that is modulated in the amplitude or frequency domain {AM or FM} by the signals being transmitted).

DC Balanced Line Codes—

Line codes, such as the previously mentioned 8B/10B line code, are codes which format a digital signal that is to be transmitted over a communication medium into a form that is optimized for transmission over a given physical channel. Consequently, a line code will typically be chosen to complement the physical capabilities of a given transmission medium, such as optical fiber or shielded twisted pair copper wire. These characteristics are unique for each transmission medium, because each medium has different characteristics associated with it such as signal distortion characteristics, capacitance, etc.

Many of these line codes are optimized for long-distance or high-speed communication channels that are hindered when transmitting a signal with a DC component. This DC component present within a signal is also known as a disparity, bias, or the DC coefficient. Line codes which aim to eliminate the DC component of a transmitted signal are known as DC-balanced line codes.

Constant-weight line codes (such as e.g., a Manchester II code utilized in the Auxiliary Channel of a DisplayPort network) are a first type of DC balanced line code that is designed so that each transmitted code word is balanced in a way that for each positive value within a code word, a substantially equal number of negative values exists. Accordingly, constant-weight line codes transform a signal to be transmitted such that the average power level over each code word is balanced.

Paired disparity line codes, on the other hand, are designed such that for every code word that averages to a negative level, another code word exists in the data stream that averages out to a positive level, thereby balancing out the transmitted signal. Paired disparity line codes typically work by keeping track of the running DC buildup at the transmitter. By keeping track of the running DC buildup, code words that tend to balance the DC level back towards zero can be selected at the transmitter. Examples of paired disparity line codes include the aforementioned 8B/10B line code.

8B/10B Encoding—

As previously discussed, the present invention may be practiced with literally any type of scrambling algorithm or line code known in the electronic arts. However, a discussion of the principles of the present invention are useful in the context of a particular given line code such as 8B/10B. DisplayPort utilizes the ANSI 8B/10B encoding (specified in ANSI X3.230-1994, clause 11, incorporated herein by reference in its entirety). 8B/10B encoding maps an 8-bit data byte or one of a set of twelve control symbols to a 10-bit symbol in order to achieve the aforementioned DC balance. The mapping is such that the mapped versions of the control symbols and data symbols are distinct. The 8-bit symbol can either be an 8-bit data byte or a control symbol. In both cases, they are mapped into 10-bit symbols. One particularly useful property of 8B/10B encoded symbols is that in any sequence of 10-bit symbols, there will never be more than a disparity of +1 or −1 when counting the number of ones and zeros (at symbol boundaries). For example, if after a number of 10-bit symbols the running disparity is −1, then the next symbol will either have exactly five (5) ones and five (5) zeros (i.e., the running disparity remains −1), or it will have six (6) ones and four (4) zeros (i.e., the running disparity changes to +1). Since the running disparity is only used at symbol boundaries, the bit-wise running disparity can range between +3 and −3.

As the scheme name suggests, eight (8) bits of data are encoded and transmitted as a 10-bit symbol. The low five (5) bits of data are encoded into a 6-bit group (i.e. the so-called 5b/6b portion) and the top three (3) bits are encoded into a 4-bit group (i.e. the so-called 3b/4b portion). These two sub-encoding groups are subsequently concatenated together to form the 10-bit symbol that is transmitted over the transmission medium. The data symbols are often referred to in the format "D.x.y" where x ranges in value from 0-31 ($2^5$=32) and y ranges in value from 0-7 ($2^3$=8), i.e. the five (5) and three (3) bit portions.

One useful property of such an encoding scheme is that since 10-bit symbols are utilized to encode 8-bit words, some of the possible one-thousand twenty-four ($2^{10}$=1024) codes can be excluded in order to comply with the previously mentioned run-length limit of five (5) consecutive equal bits and a differential limit such that the difference of the count of 0s and is no more than two (2) for a given twenty bit string of bits. In addition, some of the twohundred fifty-six (256) possible 8-bit words can be encoded in two alternative ways. Using these alternative encodings, the scheme is able to affect long-term DC-balance on the transmission line.

This DC-balance is accomplished in part via a mechanism known as "running disparity" that keeps the number of 1s and 0s that are transmitted roughly equal. That is, for each 5b/6b and 3b/4b code with an unequal number of is and 0s, there are two (2) bit patterns that can be used to transmit it. For example, a first ten-bit with two more is then 0s can be represented as follows: 001011 1110. This first ten-bit pattern can also be represented by its inverse, thereby encoding two more 0s than is as follows: 110100 0001. Accordingly, depending on the current running disparity of the signal, the encoding hardware selects which of the two possible 10-bit sequences to send for the given data.

In addition, 8B/10B encoding possesses what are known as a "special symbols". They are typically referred to in the form "K.x.y" and have different encodings from any of the possible "D.x.y" symbols; i.e., they are symbols which can not result via the encoding of an 8-bit data symbol. Table 1 below illustrates the format for these special symbols, which include a first 10-bit code for a running disparity of negative one (−1), along with its inverse for a running disparity of positive one (+1):

TABLE 1

8B/10B Special Symbols

| Input - Special Symbols | | RD = −1 | RD = +1 |
|---|---|---|---|
| K-Codes | HGF EDCBA | abcdei fghj | abcdei fghj |
| K.28.0 | 000 11100 | 001111 0100 | 110000 1011 |
| K.28.1 | 001 11100 | 001111 1001 | 110000 0110 |
| K.28.2 | 010 11100 | 001111 0101 | 110000 1010 |
| K.28.3 | 011 11100 | 001111 0011 | 110000 1100 |
| K.28.4 | 100 11100 | 001111 0010 | 110000 1101 |
| K.28.5 | 101 11100 | 001111 1010 | 110000 0101 |
| K.28.6 | 110 11100 | 001111 0110 | 110000 1001 |
| K.28.7 | 111 11100 | 001111 1000 | 110000 0111 |
| K.23.7 | 111 10111 | 111010 1000 | 000101 0111 |
| K.27.7 | 111 11011 | 110110 1000 | 001001 0111 |
| K.29.7 | 111 11101 | 101110 1000 | 010001 0111 |
| K.30.7 | 111 11110 | 011110 1000 | 100001 0111 |

These special symbols are inserted into the data stream and accordingly, can be used for executing low-level control functions separate and apart from encoded data symbols. For example, the DisplayPort specification sets forth a number of control functions that can be mapped onto these so-called "K-codes" of the ANSI 8B/10B encoder specification. These control functions include: (1) Blanking Start (BS); (2) Blanking End (BE); (3) Fill Start (FS); (4) Fill End (FE); (5) Secondary-data Start (SS); (6) Secondary-data End (SE); (7) Scrambler Reset (SR); (8) Content Protection BS (CPBS); and (9) Content Protection SR (CPSR).

Unfortunately, while individual K-codes are not particularly high or low in EMI, EMI can become an issue when K-codes are repeated multiple times. In fact, some K codes are worse for EMI when they are repeated than others due to the frequency content of the encoding for the control symbol. For example, if a particular control symbol is not scrambled, but is transmitted repeatedly (even when interspersed with other symbols in between each occurrence) then the radiated energy from the device will peak at a frequency related to the repeat rate of the control symbol. Such energy spikes can result in (a) difficulty meeting regulatory requirements (e.g., Electromagnetic Emissions Compliance), (b) internal electromagnetic interference between the components implementing the communications network and other unrelated functions in the device, such as (but not limited to): wireless communications using Bluetooth, Wi-Fi or cell-phone networking.

Methods—

Figure 1:
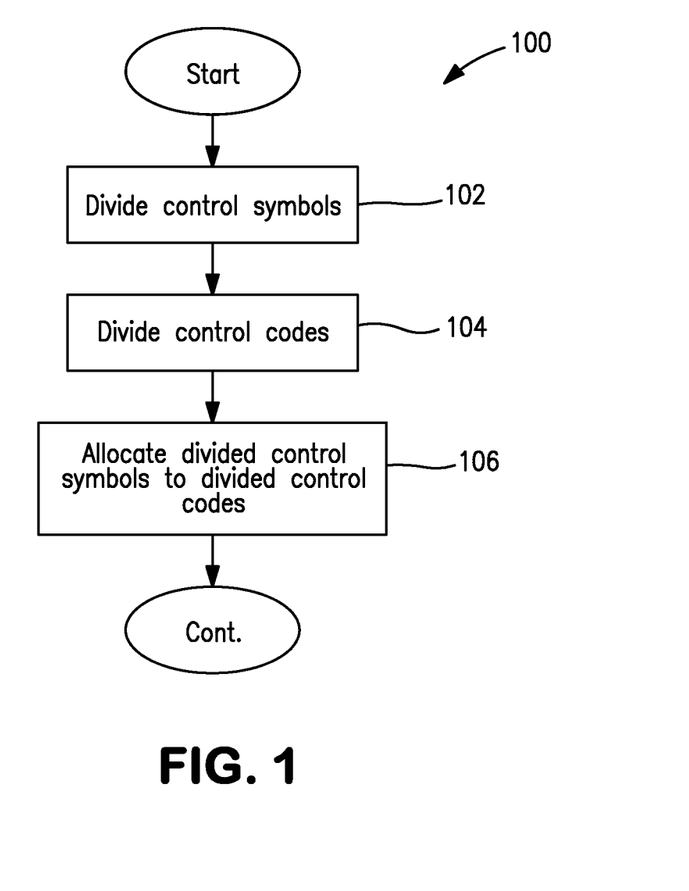
FIG. 1 is a process flow diagram illustrating the process steps for allocating control symbols to control codes in accordance with one embodiment of the present invention.

Referring now to FIG. 1, exemplary methodology 100 for allocating control symbols (such as the aforementioned DisplayPort control functions) to DC-balanced control codes or special symbols (e.g. 8B/10B "K-codes") in accordance with the principles of the present invention is shown and described in detail.

At step 102 of the method 100, control symbols are divided up into groups based on a predetermined criterion. In one embodiment, control symbols associated with the DisplayPort specification are categorized based on their expected frequencies (in time) of appearance in a transmitted data stream. Based on these expected frequencies of appearance, these control symbols can then be allocated to a group. For example, two groups may be created: (1) a first group for control symbols that are expected to be seen relatively frequently; and (2) a second group for control symbols that are expected to be seen relatively infrequently. In an alternative embodiment, control symbols which could benefit a user of those control symbols by remaining unscrambled during transmission could be allocated to a first group, while other control symbols which do not offer such a benefit could be allocated to a second group. For example, if the scrambler reset control sequence is scrambled, then recovering scrambler synchronization is much more difficult as the receiver cannot identify what point in the sequence the scrambler is reset. In yet another alternative embodiment, the control symbols might not be allocated to distinct groups at all, but rather categorized individually according to a predetermined criterion.

At step 104, control codes (i.e., "special" symbols) are similarly divided up into groups. In the context of the exemplary 8B/10B line code described previously herein, 8B/10B control codes (i.e. "K-codes") are divided up based at least in part on a characteristic of that control code. For example, different K-codes have specific 10-bit patterns associated with them (see Table 1 above). Some of these patterns will affect the transmission medium differently by, for instance, introducing a bit pattern that emits (or conversely is susceptible to) more or less EMI. Accordingly, in an exemplary embodiment, it is desirable to divide up 8B/10B K-codes into groups based on these EMI considerations.

At step 106, the control symbols divided at step 102 are allocated or mapped to respective ones of control codes allocated at step 104. In one exemplary embodiment, the allocation is done on a group-by-group basis. For example, those control symbols categorized into a group where they are expected to be seen relatively frequently in time are allocated to control codes that are associated with a group that has desirable EMI performance characteristics (and hence causing use of the control codes with desirable EMI properties more frequently).

In an alternative embodiment, the control symbols are allocated on a symbol-by-symbol basis; i.e., a first control symbol will always be allocated to a corresponding control code.

In yet another alternative embodiment, the allocation is performed on a mixed basis; i.e., some control symbols are allocated on a group-by-group basis while others are allocated on a symbol-by-symbol basis. In other words, the group-by-group basis refers to the property that for any given control function, its corresponding control code could potentially be chosen from any control code within a group, whereas the symbol-by-symbol basis refers to the property that for any given control function, its designated control code is always the same value.

Furthermore, for example in the context of 8B/10B line codes, the control symbols that are allocated to control codes on a group-by-group basis don't necessarily have to be mapped on a 1:1 basis. For instance, a portion of all available control symbols might be divided up into a first group consisting of eight (8) control symbols, while control codes divided up based on EMI considerations are divided up into another group consisting of nine (9) control codes. Accordingly, the eight (8) control symbols (or functions) of the first group are allocated to the corresponding group of nine (9) control codes. Such a configuration has benefits over a 1:1 mapping by further "spreading" the allocated control symbols over a larger number of control codes at the expense of additional system complexity.

Figure 2:
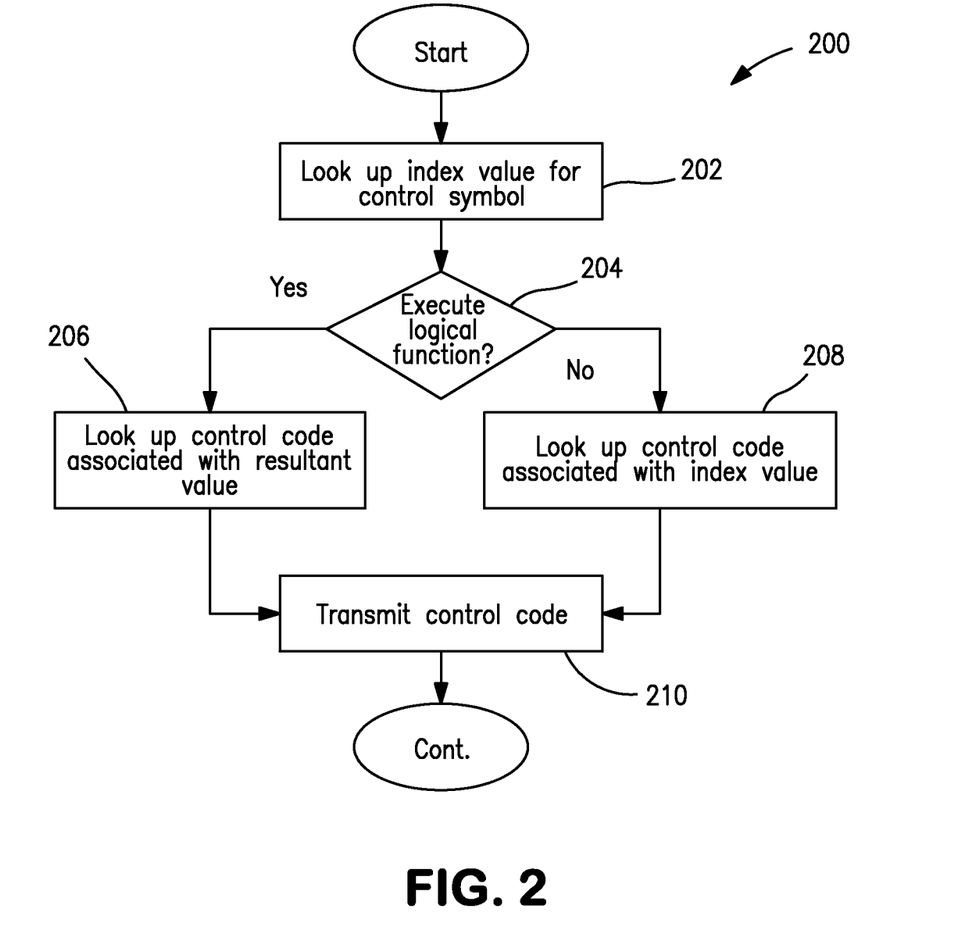
FIG. 2 is a logical flow diagram illustrating the process steps for transmitting control codes associated with control symbols in accordance with one embodiment of the present invention.

Referring now to FIG. 2, an exemplary methodology 200 for transmitting control codes associated with control symbols (such as those described in FIG. 1) is shown and described in detail. At step 202, an index value associated with a control symbol is determined (e.g., looked up from a table or other data structure). In an exemplary embodiment, index values associated with a control symbol are allocated based on previously allocated groups (see step 102, FIG. 1), although this is by no means a requirement—the methodology of FIG. 2 can be executed independently of the method steps of FIG. 1. For example, consider the case where nine (9) control symbols are allocated between two groups; the first group consisting of eight (8) of the nine (9) control symbols and the second group consisting of the remaining one (1) control symbol. The control symbols of the first group are then associated with an index value comprising an integer value in the range of 0-7, while the second group consisting of the lone remaining control symbol includes a range of integer values from 0-3. At step 202, the index value for a given control symbol is looked up, and will be an integer value in the range of 0-7.

At step 204, it is determined whether a logical function should be executed on the index value looked up at step 202. If yes, the logical process flow proceeds to step 206, otherwise it proceeds to step 208. In an exemplary embodiment, if it is determined that a logical function should be executed, the index value from step 202 is scrambled vis-à-vis an XOR or other such operation with one or more bits of a scrambler. The determination of whether or not a logical function should be executed is determined according to any number of different schemes; e.g., based on which grouping the index value originated from (e.g., Group 1, etc.). In an alternative embodiment, the determination may be made according to a timing criterion. For example, in one embodiment, control symbols transmitted during a predetermined interval of time will always be scrambled while during another period of time, the control symbols will remain unscrambled. Such embodiments may require significantly more complexity to synchronize time context between the encoder on the TX side and the decoder on the RX side.

At step 206, the scrambled index value is associated with a control code index value. In an exemplary embodiment, this is performed on a group-by-group basis. For example, the scrambled index value resulted from the scrambling of an index value associated with a Group 1 control symbol and accordingly, the control code will be looked up from a group of control codes associated with the Group 1 control symbols. In an alternative embodiment, this is performed on a symbol-by-symbol basis as described previously herein.

At step 208, if the logical function execution step previously described is not performed, then the control value is looked up based on the index value determined at step 202. Again, it is recognized that step 208 may be performed on either a group-by-group and/or a symbol-by-symbol basis. At step 210, the control code that was looked up at either step 206 or step 208 is transmitted across the transmission medium (e.g., wireline or wireless interface).

Figure 3:
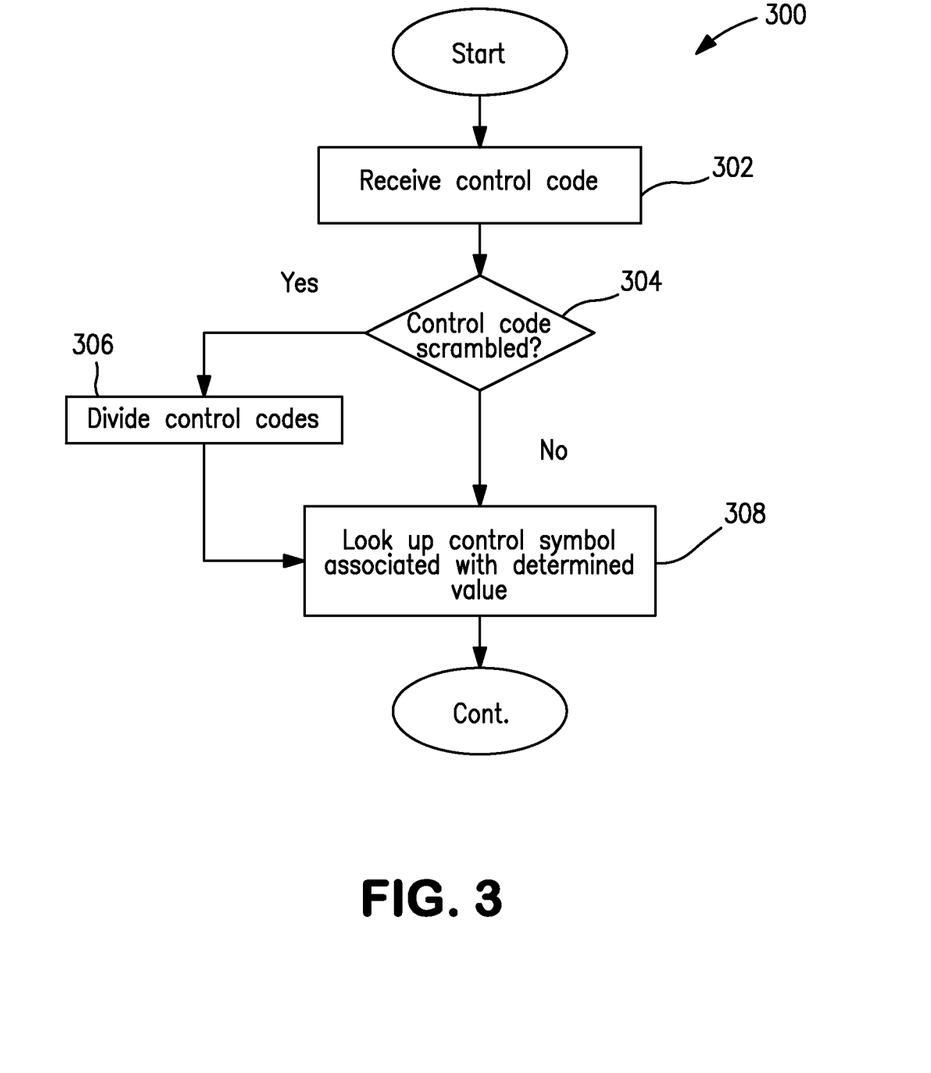
FIG. 3 is a logical flow diagram illustrating the process steps for determining control symbols associated with a received control code in accordance with one embodiment of the present invention.

Referring now to FIG. 3, one exemplary methodology 300 for determining control symbols associated with a received control code according to the invention is shown and described in detail. At step 302, the control code symbol is received at a receiver. At step 304, it is determined whether or not the control code is scrambled or not. If it is, then at step 306, a logical function is executed on the received control code symbol. In an exemplary embodiment, the logical function includes an XOR function executed on one or more bits of a scrambler that are executed on a group-by-group basis. Specifically, the executed XOR function will be utilize a scrambler identical to that used in the transmission of the control code so that index value associated with that control code can be readily derived.

At step 308, the index value that was either derived at step 306 or determined directly from the received control code at step 302 is used to look up the control symbol associated with that determined index value.

Example #1

In a first embodiment that implements the intelligent association methodology described previously herein, an 8B/10B scrambler in compliance with ANSI INCITS 230-1994, entitled "FibreChannel—Physical and Signaling Interface (FC-PH)" published Jan. 1, 1994 and incorporated herein by reference in its entirety is contemplated within the context of a DisplayPort implementation. The control symbols utilized in the 8B/10B scrambler are partitioned into a large group and a small group comprising a group of $2^3=8$ and $2^2=4$ slots, respectively. In the context of DisplayPort, these divided groups of control symbols are shown below divided into Tables 2 and 3 below, and subsequently assigned an integer index value (in the presently contemplated embodiment, the integers are in the range 0-12) as shown below:

TABLE 2

Group 1 Control Symbol Index Table

| Control Symbol | Index Value |
| --- | --- |
| BS | 0 |
| BE | 1 |
| SS | 2 |
| SE | 3 |
| FS | 4 |
| FE | 5 |
| SR | 6 |
| CPBS/CP | 7 |

TABLE 3

Group 2 Control Symbol Index Table

| Control Symbol | Index Value |
|---|---|
| CPSR/BF | 0 |
| (reserved) | 1 |
| (reserved) | 2 |
| (reserved) | 3 |

In the illustrated embodiment, the division of the control symbols is allocated by generally placing the most infrequently (i.e., most widely spaced in time) utilized control symbols in the smaller group (Table 3 above).

In addition to dividing up DisplayPort control symbols, the present embodiment also further divides up the control codes (i.e. K-codes) into two groups and associates an index value with each control code as shown below. It should also be recognized that while the current embodiment shows a one to one (1:1) mapping of control symbols to control codes, the present invention is not so limited.

Accordingly, to scramble and transmit a control symbol in Group 1, the symbol is looked up in Table 2 to find its index integer value. In a next step, the index is then XOR'd with the current value of $n_1$ (e.g., three) specified bits of the scrambler. In one exemplary embodiment, this is accomplished by an XOR of the index value with bits 1, 3 and 5 of the scrambler, where the least significant bit is bit 0. The resultant value is then compared with Table 4 below, and the specific control code is selected based on this resultant value. The control code corresponding to the resultant value that is looked up in Table 4 is then transmitted across the network.

TABLE 4

Group 1 Control Code Index Table

| Special Symbol | Index Value |
|---|---|
| K.28.5 | 0 |
| K27.7 | 1 |
| K.28.2 | 2 |
| K.29.7 | 3 |
| K.30.7 | 4 |
| K.23.7 | 5 |
| K.28.0 | 6 |
| K.28.1 | 7 |

Similarly, to scramble and transmit a control symbol in Group 3, the symbol is looked up in Table 3 to find its index value, and the index value XOR'd with the current value of n2 (e.g., two) specified bits of the scrambler. For example, bits 1 and 3 of the scrambler are utilized for the XOR operation in one embodiment. The resultant value is then compared with Table 5 and the specific control code is selected based on this resultant value. The control code corresponding to the resultant value that is looked up in Table 5 is then transmitted across the network.

TABLE 5

Group 2 Control Code Index Table

| Special Symbol | Index Value |
|---|---|
| K.28.3 | 0 |
| K.28.4 | 1 |
| K.28.6 | 2 |
| K.28.7 | 3 |

Conversely, to de-scramble a received control code (i.e., whenever a control code is detected in the received stream), the control code is looked up in either Table 4 and/or Table 5 to find its corresponding group and index value. For a Group 1 control code, the index value is XOR'd with the current value of the $n_1$ (e.g., three) specified bits of the scrambler used for transmitting Group 1 control symbols. Similarly, for a Group 2 control code, the index value is XOR'd with the current value of the $n_2$ (e.g., two) specified bits of the scrambler used for transmitting Group 2 control symbols. For a Group 1 control code, look up the resulting value in Table 2 to find the specific control symbol corresponding to this value, and for a Group 2 control code, look up the resultant value in Table 3 to find the specific control symbol corresponding to this value. The resulting control symbol is subsequently utilized.

Example #2

In a variant to Example #1 discussed above, the Scrambler Reset control symbol ("SR") to the Group 2 control symbol table and to allocate K28.0 (used for SR in Example #1 above) to the Group 2 control code table. However, the SR control symbol is not scrambled (and hence not de-scrambled at the receiver). Such a variant to Example #1 may, under certain conditions, be more robust to scrambler loss of sync. Unlike Example #1 which scrambles symbols in both groups and may have difficulty recognizing scrambler synchronization when synchronization is lost, the symbol for scrambler synchronization (SR) in Example #2 can always be recognized regardless of the current state of the receiver's descrambler.

Example #3

In yet another embodiment of the invention that implements the intelligent association methodology described previously herein, an 8B/10B scrambler is again contemplated within the context of a DisplayPort implementation. The control symbols utilized in the 8B/10B scrambler are partitioned into a large group and a small group comprising a group of $2^3$=8 and $2^2$=4 slots, respectively. These divided groups of control symbols are shown below divided into Tables 6 and 7, and subsequently assigned an integer index value (in the present embodiment, the integers are in the range 0-12) as shown below:

TABLE 6

Group 1 Control Symbol Index Table

| Control Symbol | Index Value |
|---|---|
| SR | 0 |
| CPBS/CP | 1 |
| SS | 2 |
| FE | 3 |
| BS | 4 |
| PM | 5 |

TABLE 6-continued

Group 1 Control Symbol Index Table

| Control Symbol | Index Value |
|---|---|
| SE | 6 |
| FS | 7 |

TABLE 7

Group 2 Control Symbol Index Table

| Control Symbol | Index Value |
|---|---|
| CPSR/BF | 0 |
| (reserved) | 1 |
| BE | 2 |
| SCM | 3 |

In the groupings shown above in Tables 6 and 7, the Table 6 Control symbols occur more frequently, while the group in Table 7 occurs less frequently. Because the control symbols in Table 7 occur so infrequently, there is consequently little benefit in scrambling these control symbols, as had been done in Example #1. In addition, there is also a diagnostic purpose benefit to this approach; i.e., bus analyzers and other diagnostic equipment are able to recognize these control symbols on the transmission medium without needing to first de-scramble the signals.

The available ANSI 8B/10B control codes (K-codes) are also split into two groups. Within each group, each K-code is associated with a unique index as set forth below in Tables 8 and 9, below:

TABLE 8

Group 1 K-Code Index Table

| Special Symbol | Index Value |
|---|---|
| K.28.0 | 0 |
| K.28.1 | 1 |
| K.28.2 | 2 |
| K.28.3 | 3 |
| K.28.5 | 4 |
| K.28.7 | 5 |
| K.29.7 | 6 |
| K.30.7 | 7 |

TABLE 9

Group 2 K-Code Index Table

| Special Symbol | Index Value |
|---|---|
| K28.6 | 0 |
| K23.7 | 1 |
| K27.7 | 2 |
| K28.4 | 3 |

Accordingly, to scramble and transmit a control symbol in Group 1, the symbol is looked up in Table 6 to find its index integer value. In a next step, the index is XOR'd with the current value of e.g., three specified bits of the scrambler. In one exemplary embodiment, this is accomplished by an XOR of the index value with bits 13, 11 and 9 of the scrambler, where the least significant bit is bit 0. Note also that current DisplayPort implementations utilize bits 15-8 for scrambling data. The resultant value is then compared with Table 8 and the specific control code is selected based on this resultant value. The control code corresponding to the resultant value that is looked up in Table 8 is then transmitted across the network.

Dealing with Group 2 (see Table 7) control symbols is advantageously very straightforward in the embodiment illustrated. The symbol is looked up in Table 7 to find its index value. The resultant index value is then cross-correlated with the K-code attributed to it in Table 9 and the corresponding K-code is transmitted unscrambled.

To de-scramble a received control code (i.e., whenever a scrambled control code is detected in the received stream), the control code is looked up in Table 6 to find its corresponding group and index value. For a Group 1 control code, the index value is XOR'd with the current value of the three specified bits of the scrambler used for transmitting Group 1 control symbols. The resulting value is then looked up in Table 6 to find the specific control symbol corresponding to this value. The resulting control symbol is subsequently utilized.

It will be noted that in the foregoing example (and in fact others), the groupings may be broken down so as to comprise seven (7) low EMI producing control symbols and one (1) high EMI producing control symbol in one group (e.g., Group 1), while the second group (e.g., Group 2) includes three (3) high EMI producing control symbols and one (1) low EMI producing control symbol. Other such combinations will be appreciated as well by those of ordinary skill given the present disclosure.

Example #4

In yet another embodiment of the invention that implements the intelligent association methodology described previously herein, an 8B/10B scrambler is again contemplated within the context of a DisplayPort implementation.

In the current version of DisplayPort, the header control functions are mapped according to Table 10.

TABLE 10

Header Control Functions

| Control Function | Control Sequence | Comment |
|---|---|---|
| SR (Scrambler Reset) | K28.5 | Comma Character; Link Frame Indicator |
| Reserved | K28.1 | Not used |
| Reserved | K28.7 | Not used |
| Reserved | K28.4 | Not used |
| ACT (Allocation Change Trigger) | C0-C1-C1-C0 | Trigger to downstream device indicating change in allocation on local link. |

Additionally, payload control functions are mapped according to Table 11.

TABLE 11

Payload Control Functions

| Control Function | Control Sequence |
|---|---|
| RG (Rate Governing) | C0-C1-C2-C3 |
| BS (Blank Start) | C0-C0-C0-C0 |
| BE (Blank End) | C1-C1-C1-C1 |
| Reserved | C2-C2-C2-C2 |
| SS (Secondary Start) | C3-C3-C3-C3 |
| SF (Stream Fill) | C4-C4-C4-C4 |

TABLE 11-continued

Payload Control Functions

| Control Function | Control Sequence |
|---|---|
| Reserved | C5-C5-C5-C5 |
| SE (Secondary End) | C6-C6-C6-C6 |
| Reserved | C7-C7-C7-C7 |

Where the control symbol Cx, defines a (pre-scrambled) index integer value between 0 and 7. The scrambled index is calculated using the current contents of the main link data scrambling LFSR as follows:

$$\text{Scrambled Index} = \text{Index}^{\wedge}\{LFSR[13], LFSR[14], LFSR[15]\} \quad \text{Equation 1—Scrambled Index}$$

The scrambled index determines the actual K-code transmitted according to Table 12.

TABLE 12

K-Code Scrambled Index Map

| Scrambled Index | K-Code |
|---|---|
| 0 | K23.7 |
| 1 | K27.7 |
| 2 | K28.0 |
| 3 | K28.2 |
| 4 | K28.3 |
| 5 | K28.6 |
| 6 | K29.7 |
| 7 | K30.7 |

Apparatus—

Figure 4:
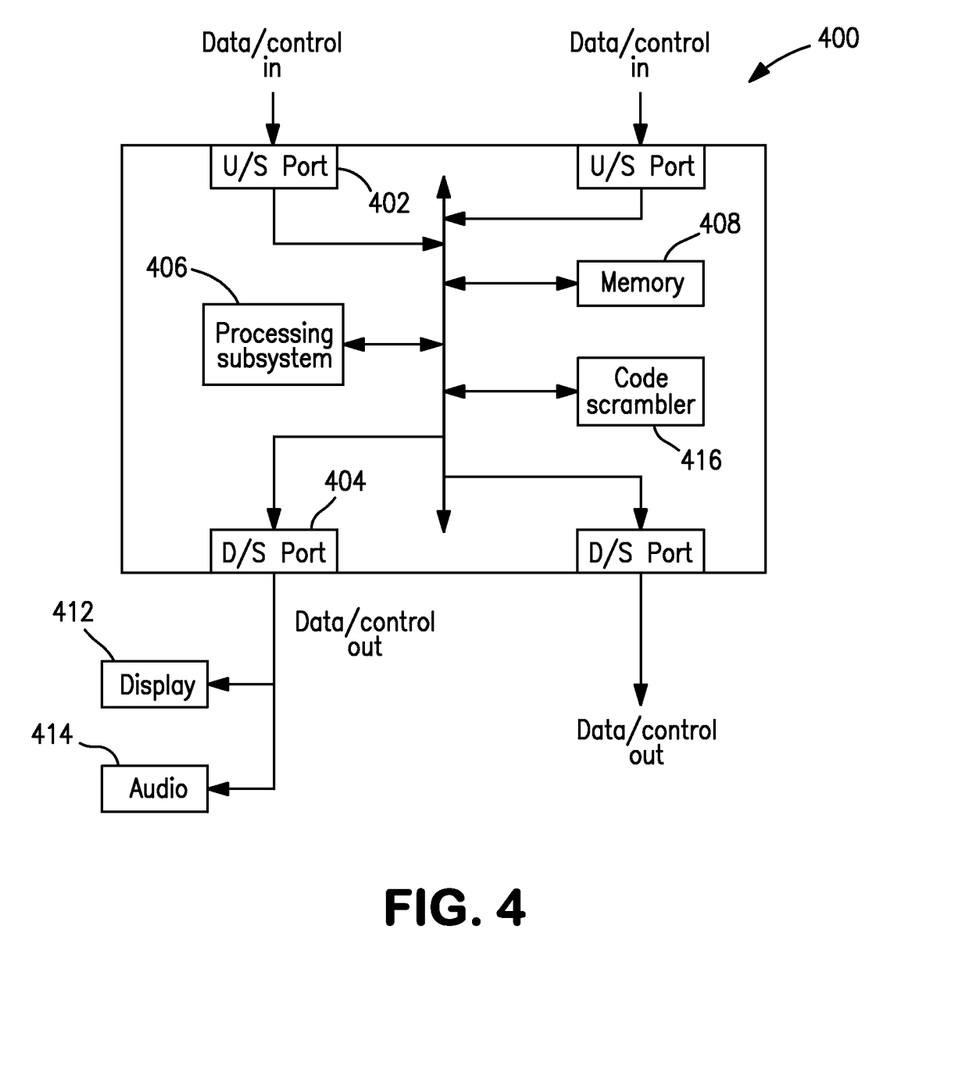
FIG. 4 is a functional block diagram illustrating one embodiment of a network component apparatus adapted to implement the intelligent control code association methods of the present invention.

Referring now to FIG. 4, an exemplary user device apparatus 400 having control code scrambling capability is illustrated. As used herein, the term "user device" includes, but is not limited to cellular telephones, smartphones (such as for example an iPhone™), personal computers (PCs), such as for example an iMac™, Mac Pro™, Mac Mini™, MacBook™, MacBook Pro™, MacBook Air™, and mini-computers, whether desktop, laptop, or otherwise, as well as mobile devices such as handheld computers, PDAs, video cameras, set-top boxes, personal media devices (PMDs), such as for example an iPod™, iPad™ display devices (e.g., those compliant with the aforementioned DisplayPort standard(s)), or any combinations of the foregoing. While a specific device configuration and layout is shown and discussed, it is recognized that many other implementations may be readily implemented by one of ordinary skill given the present disclosure, the apparatus 400 of FIG. 4 being merely illustrative of the broader principles of the invention.

The illustrated apparatus 400 of FIG. 4 includes an upstream plurality of ports and corresponding receiving elements (e.g., receiver or transceiver network interfaces) 402, a downstream plurality of ports and corresponding transmitting elements (transmitting interfaces or transceivers) 404. As used herein, the terms "network interface" or "interface" typically refer to any signal, data, or software interface with a component, network or process including, without limitation, those of the FireWire (e.g., FW400, FW800, etc.), USB (e.g., USB2, USB 2.0, USB 3.0, wireless USB), DisplayPort, Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi™ (e.g., 802.11a,b,g,n, or any draft standards relating thereto), WiMAX (802.16), PAN (802.15), IrDA or other wireless families, including Bluetooth.

The upstream plurality of ports and associated receiving elements 402 may comprise one or more upstream auxiliary channels, one or more upstream media ports, and receiver apparatus (e.g., multiplexing switches, reception logic, clock recovery circuitry, etc.). In one exemplary embodiment, the auxiliary channel is bi-directional and carries management and device control data, and the upstream media ports minimally comprise receivers for unidirectional data lanes, and use of an embedded clock. The receiver apparatus monitors and selectively enables and disables the auxiliary and media ports. In certain embodiments, the receiver apparatus may be adapted to utilize a packet-based unidirectional network protocol, such as the DisplayPort protocol previously described herein.

Similarly, the downstream plurality of ports and associated receiving elements 404 comprise one or more downstream auxiliary channel, one or more downstream media ports, and transmitter apparatus (e.g. demultiplexing switches, transmission logic, clock embedding circuitry, etc.). In one exemplary embodiment, the auxiliary channel is bi-directional and carries management and device control data, and the downstream media ports minimally comprise transmitters for unidirectional data lanes, and inclusion of an embedded clock. The transmitter apparatus monitors and selectively enables and disables the auxiliary and media ports. As with the receiver, the transmitter apparatus may be adapted to utilize a packet-based unidirectional network protocol (e.g., DisplayPort).

In an exemplary embodiment, the downstream-facing ports may comprise a serializer adapted to receive an input word and output a bit stream. For example, in one embodiment, the serializer may receive a 10-bit input word and output ten (10) serial bits. In addition, the serializer may also provide an optional corresponding clock.

Conversely, in an exemplary embodiment, the upstream-facing ports may also comprise a de-serializer adapted to receive a serial bit stream and output a word. Furthermore, such de-serializing apparatus may additionally require clock recovery circuitry, and boundary detection as is well understood in the digital computing arts. For example, in one embodiment, the de-serializer may receive 10 (ten) serial bits, and convert it into one 10-bit word. When the de-serializer detects a misalignment of timing by one or more bits, the de-serializer accordingly skips or pads its rate accordingly. Furthermore, during initialization, the de-serializer may recognize an initiation sequence.

Also included are one or more storage devices (e.g., a memory subsystem) 410. It will be appreciated that not all elements are required in a single device for operation within a network. For instance, a device only capable of "source" operation would not require upstream ports, or certain audio or video elements. Conversely, a "sink" device may not require downstream ports. Moreover, the "receiver" 402 and "transmitter" 404 elements may comprise transceivers capable of both transmission and reception if desired.

The processing subsystem 406 may comprise one or more of central processing units (CPU) or digital processors, such as a microprocessor, digital signal processor, field-programmable gate array, RISC core, or plurality of processing components mounted on one or more substrates. The processing subsystem is coupled to operational memory, which may include for example SRAM, FLASH and SDRAM components. As used herein, the term "memory" includes any type of integrated circuit or other storage device adapted for storing digital data including, without limitation, ROM.

PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 406 includes discrete components, however it is understood that in some embodiments they may be consolidated or fashioned in a SoC (system-on-chip) configuration.

The processing subsystem 406 is adapted to receive one or more media streams from an upstream apparatus 402 for processing for media displays such as a video display 412, or audio speakers 414. Processing subsystem 406 may preferentially comprise graphics processors, applications processors, and or audio processors. In "thin clients", the processing subsystem 406 may be significantly reduced in complexity and limited to simple logic, or in extreme cases altogether non-existent. Accordingly, the processing subsystem 406 may be connected to a memory subsystem 410 comprising memory which may for example be hard disk drives, or solid state memory (e.g. RAM, FLASH) type components. The memory subsystem may implement one or a more of DMA type hardware, so as to facilitate data accesses as is well known in the art.

The control code scrambling circuitry 416 is, in an exemplary embodiment, tightly coupled for execution on the processing subsystem. This circuitry could be embodied in hardware, software or a combination of both. As used herein, the term "circuitry" refers to any type of device having any level of integration (including without limitation ULSI, VLSI, and LSI) and irrespective of process or base materials (including, without limitation Si, SiGe, CMOS and GaAs). ICs may include, for example, memory devices, digital processors, SoC devices, FPGAs, ASICs, ADCs, DACs, transceivers, memory controllers, and other devices, as well as any combinations thereof. It is however recognized that the control code scrambling circuitry could alternatively be decoupled and executed independent of the processing element in alternate embodiments.

It will be readily appreciated by those of ordinary skill that different combinations and/or variations of the foregoing can be made depending on the desired application and performance attributes.

In an exemplary embodiment, the control code scrambling circuitry 416 of the apparatus of FIG. 4 is implemented at least in part as a computer program; e.g., module of executable application software embodied within a tangible medium such as a physical block of memory (for example, the memory subsystem 408 of FIG. 4). As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Business Methods—

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus configured to receive media according to one or more transmitted control functions, the apparatus comprising:
 a receiver configured to receive one or more control codes associated with one or more corresponding control functions, at least one of the one or more control codes being dynamically encoded; and
 logic in communication with the receiver and configured to determine a corresponding control function for each control code of the received one or more control codes, the logic configured to:
  determine whether the each control code comprises a dynamically encoded control code or a non-encoded control code;
  decode the dynamically encoded control code based on one or more contents of a linear feedback shift register (LFSR);
  identify a corresponding control function from the decoded control code based on a look-up table; and
  identify a corresponding fixed control function based on the non-encoded control code;
 wherein the received one or more control codes are divided into a first group and a second group based on a different frequency of use of respective ones of the received one or more control codes.

2. The apparatus of claim 1, where the look-up table comprises an association of one or more control functions to one or more control symbol sequences.

3. The apparatus of claim 2, where the one or more control symbol sequences comprise a plurality of control codes.

4. The apparatus of claim 3, where the corresponding fixed control function is based on a single non-encoded control code.

5. The apparatus of claim 4, where the single non-encoded control code is configured to cause a reset of the LFSR.

* * * * *